United States Patent [19]

Lebrun et al.

[11] Patent Number: 4,837,696

[45] Date of Patent: Jun. 6, 1989

[54] METHOD AND DEVICE FOR GUIDING AN AERODYNE ON A RUNWAY, PARTICULARLY DURING THE TAXIING PHASE PRECEDING TAKE OFF

[75] Inventors: Jean-Louis Lebrun, Antony; Patrick Pont, Paris, both of France

[73] Assignee: Societe Francaise d'Equipements pour la Navigation Aerienne (S.F.E.N.A.), France

[21] Appl. No.: 10,515

[22] Filed: Feb. 3, 1987

[30] Foreign Application Priority Data

Feb. 6, 1986 [FR] France .................. 86 01929

[51] Int. Cl.$^4$ .............................................. G06F 15/50
[52] U.S. Cl. .................................. 364/427; 73/178 T
[58] Field of Search ............... 364/427, 428, 439, 453; 73/178 T; 340/959

[56] References Cited

U.S. PATENT DOCUMENTS

| 3,382,351 | 5/1968 | Schweighofer et al. | 364/427 |
| 4,122,522 | 10/1978 | Smith | 364/427 |
| 4,251,868 | 2/1981 | Aron et al. | 364/427 |
| 4,454,582 | 6/1984 | Cleary et al. | 364/427 |
| 4,638,437 | 1/1987 | Cleary et al. | 364/427 |

*Primary Examiner*—Gary Chin
*Attorney, Agent, or Firm*—William A. Drucker

[57] ABSTRACT

A method and device are provided for guiding an aerodyne on the runway, particularly during the taxiing phase preceding take off, the device including an inertial unit adapted for delivering signals representative of the North speed, of the East speed, of the azimuth and of the ground speed of the aerodyne. From these signals, a computer elaborates a parameter defining the axis of the runway, during an apprenticeship step during which the aerodyne, guided on site by the pilot, taxies along the axis of the runway, and stores this parameter at the end of the step. The computer then delivers to the means piloting the aerodyne a synthetic runway aberration signal between the axis of the runway thus stored and the position of the aerodyne delivered by the inertial unit.

15 Claims, 3 Drawing Sheets

METHOD AND DEVICE FOR GUIDING AN AERODYNE ON A RUNWAY, PARTICULARLY DURING THE TAXIING PHASE PRECEDING TAKE OFF

BACKGROUND OF THE INVENTION

The present invention relates to a method and device for guiding an aerodyne on the runway, in bad visibility, particularly during the taxiing phase preceding take off.

Generally, the systems employed for effecting take off in bad visibility use a radioguidance system comprising, a transmitter disposed on the ground at the end of the runway which transmits along the axis thereof a radiobeam defining a radioalignment currently called "localiser" and, a reception system located on board the aerodyne and coupled to a detector adapted for determining the angular aberration between the aircraft and the axis of the runway. This angular aberration may then be used for displaying a guide order, for example by means of a head up type display system, in the form of a conventional trend bar or any other known display system, such as a "PVD" (Para Visual Display) type system or even a system for displaying informations by projecting light symbols on the windscreen of the aerodyne.

Now, at the present time numerous take off runways are not provided with radioguidance systems and cannot be used for poor visibility take offs.

Furthermore, the runways having radioguidance systems become unfit for poor weather take offs, should the transmission of the radioalignment be stopped, for example because of a breakdown or of any other reason.

The object of the invention is then to overcome these problems by means of a method using a completely airborne guidance device for determining a synthetic runway aberration (position of the aerodyne/axis of the runway) without the help of any equipment on the ground.

SUMMARY OF THE INVENTION

It is based on the discovery that the navigation systems used at the present time include more and more often inertial units whose information is used by on board computers, particularly for determining the position of the aerodyne.

However, up to now, the use of these navigational systems has never been contemplated for on the runway guidance and, in particular, for determining the angular or metric aberration between the position of the aerodyne and the axis of the runway, in particular in the absence of information transmitted by ground installations, no parameter is available on board the aerodyne relative to the axis of the runway and its orientation.

In order to solve this problem the invention proposes however a solution which advantageously allows the inertial navigational system equipping the aerodyne to be used for guiding it on the runway, in poor visibility, during the taxiing phase preceding take off.

According to the invention, this method comprises more particularly the two following successive steps at least:

a first step, called apprenticeship step, during which the aerodyne initiates the taxiing phase at low speed and is guided at view by the pilot along the axis of the runway, whereas, at the same time, a computer makes an estimation of at least one parameter defining this axis from the information supplied by the inertial unit and stores this parameter at the end of the step, and a second stage comprising the elaboration by the computer of a synthetic runway aberration signal between the position of the aerodyne, whose parameters are determined by the computer from information delivered by said unit, and the axis of the runway whose parameters have been previously stored, and guidance of the aerodyne using said synthetic runway aberration.

Of course, the synthetic runway aberration signal thus obtained may serve for elaborating a guide order usable by a display system, for example of the head up type or by a servo control directing the aerodyne on the ground.

It should be noted in this connection that during the first step the speed of the aerodyne, initially at rest, will progressively increase while remaining however sufficiently low so that even with poor visibility the pilot can guide the aerodyne on site strictly along the axis of the runway.

During the second step, the speed of the aerodyne exceeds the threshold from which the pilot can no longer guide the aerodyne on site. Guidance is then provided through the synthetic runway aberration elaborated by the computer.

The problem which then needs to be solved for implementing the invention is that of determining the synthetic runway aberration. In fact, the inertial unit equipping aerodynes of the present time do not have sufficient accuracy for on the runway guidance, mainly because of the two following causes of errors:

a first cause of error due to alignment defects of the inertial unit in azimuth guidance (aberration between the true North and the North determined by the unit);

a second cause of error affecting the North and East speeds determined by the unit, errors of this type being limited but evolutive in time (Schüler's sinusoid).

Thus, according to another feature of the invention, for eliminating the first cause of error the method may include:

(a) during the apprenticeship step:

detecting by the unit the North and East speeds (VN and VE) as well as the azimuth $\psi o$;

estimating by the computer the transverse speed vT of the aerodyne ($VT = VE \cos \psi o - VN \sin \psi o$);

calculating the aberration Yo seen by the unit between the aerodyne and the axis of the runway by intergration in time of the transverse speed vT during the apprenticeship phase;

calculating the distance D travelled on the ground by the aerodyne by integration in time of the ground speed VG of the aerodyne, during the apprenticeship phase;

determining, by the computer, at the end of the apprenticeship period the lane error (or false North error elaborated by the unit ) $\Delta\psi o = Yo/D$ storing this lane error $\Delta\psi o$;

(b) during the second step:

estimating the transverse speet $\hat{v}T$ corrected by the lane error $\Delta\psi o$ $$(\hat{v}T = VE \cos (\psi o - \Delta\psi o) - VN \sin (\psi o - \Delta\psi o));$$

elaborating, from this transverse speed, a synthetic runway aberration signal for guiding the aerodyne.

Furthermore, to take into account the errors affecting the North and East speeds, the method of the invention may further include a first additional step preceding immediately the apprenticeship step, during which, with the aerodyne stopped and aligned as well as possible along the axis of the runway, the computer determines the mean value of the North speed and the East speed. The result of this calculation corresponds to the errors affecting these speeds, namely $\Delta VNo$ and $\Delta VEo$. These values once elaborated are then stored then subtracted from the values VN and VE acquired during the apprenticeship phase, and serve for determining the false North error then the synthetic runway aberration.

It is however clear that this solution does not allow the variation of the errors $\Delta VNo$ and $\Delta VEo$ to be taken into account during the apprenticeship and synthetic aberration calculation steps.

It will be recalled in this connection that the errors affecting the North and East speeds are evolutive in time according to Schüler's sinusoid whose period is of the order of 84 minutes. To estimate these errors, the position should then be determined on this curve at the time when the measurement is made. Now, the computer has no information for making such an estimation.

To overcome this problem, the invention proposes adding a second additional step for measuring, when stopped, the errors affecting the North and East speeds, namely $\Delta VN_1$ and $\Delta VE_1$, for example when the aerodyne is at the embarcation post, or even during the travel towards the take off runway. Thus, with the values $\Delta VN_1$ $\Delta VNo$ and $\Delta VE_1$, $\Delta VEo$, the computer may estimate the slope of Schüler's sinusoid in the zone corresponding to these values and consequently, make the necessary error corrections during the apprenticeship step and the step determining the runway aberration of the aerodyne.

BRIEF DESCRIPTION OF THE DRAWINGS

One embodiment of the device for implementing the method of the invention will be described hereafter by way of non limitative example with reference to the accompanying drawings in which.

DESCRIPTION OF THE PREFERRED EMBODIMENT

Figure 1:
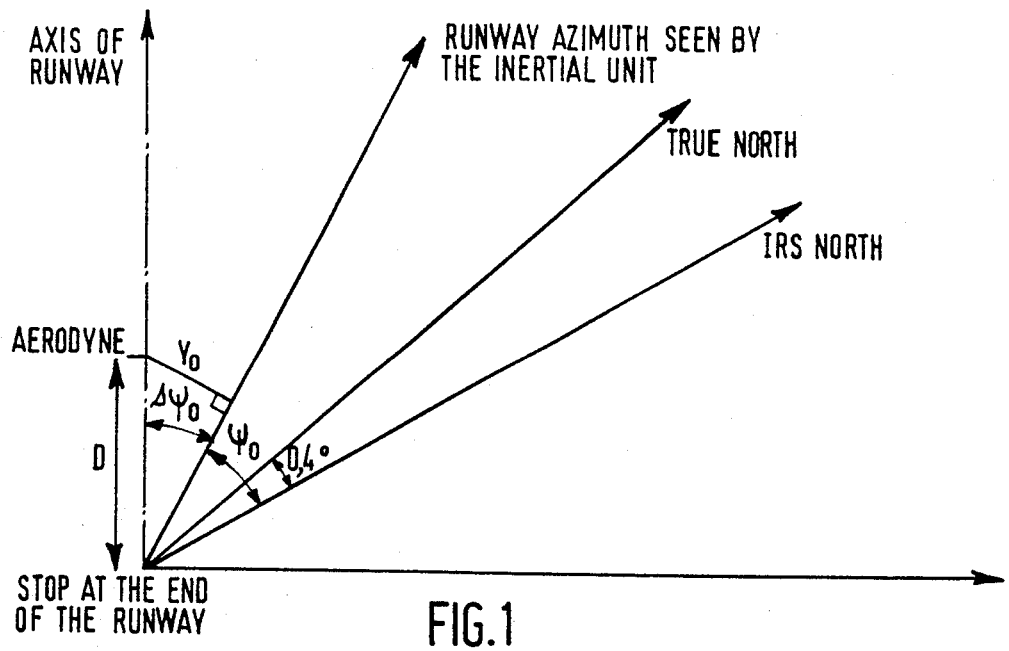
FIG. 1 is a diagram showing the main parameters used in the method of the invention.

The diagram shown in FIG. 1 shows the consequences of one of the two main causes of errors which affect the determination of the synthetic runway aberration Y.

This diagram shows particularly, by means of vectors, the true geographical North or "true North" and the North determined by the inertial unit ("IRS North"). Statistically, this IRS North may differ from the true North by an angular aberration $\Delta\psi o$ of the order of 0.4° because of an alignment defect of the unit.

It will be recalled in this connection that, in accordance with the method of the invention, the angular aberration $\Delta\psi o$ is elaborated by the computer in the following steps:

1. calculating the estimated transverse speed $vT^*$, by the relationship:

$$vT^* = \hat{V}E \cos \psi o - \hat{V}N \sin \psi o$$

with:

$\psi o$ which is the azimuth of the aircraft stopped at the end of the runway and aligned as well as possible with the axis of the runway, this azimuth taking as reference the IRS North, $\hat{V}E = VE - \Delta VEo$, that is to say the East speed (VE) detected, reduced by the aberration $\Delta Veo$ measured when the aerodyne is stopped at the end of the runway and aligned in the axis thereof, $\hat{V}N = VN - \Delta VNo$, that is to say the North speed VN detected, reduced by the aberration $\Delta VN_o$ measured when the aerodyne is stopped at the end of the runway and aligned along the axis thereof.

2. calculating of the erroneous runway aberration $Yo^*$ which the aircraft forms with the axis of the runway (seen by this unit) during the apprenticeship step, during which the aerodyne taxies as well as possible on site along the true runway axis (shown by broken lines in FIG. 1). It should be recalled in this connection that because of the false North error, the inertial unit indicates an azimuth $\psi o$ (unit azimuth) different from that of the aerodyne and, consequently, an erroneous runway abberation $Yo^*$. This erroneous runway aberration is obtained by means of the following relationship:

$$Yo^* = \int_{to}^{tfin} vT^* dt$$

in which:

*to* is the time when the pilot actuated the throttle lever to begin taxiing on the ground before take off,

*tfin* is the time marking the end of the apprenticeship step, for example the time when the aerodyne reaches the speed of 100 knots.

3. calculating the distance D travelled on the ground between time to and time tfin $$D = \int_{to}^{tfin} VG \, dt$$

in which VG is the ground speed of the aerodyne which may be calculated by the unit ($VG^2 = VN^2 + VE^2$) or by any other means.

4. Calculation of the aberration $\Delta\psi o$, from the relationship:

$$\Delta\psi o^* = Yo^*/D$$

As mentioned above, this value $\Delta\psi o^*$ as well as the realigned azimuth of the axis of the runway ($\psi o^* = \psi o - \Delta\psi o^*$) are stored at the end of the apprenticeship period for determining the true runway aberration Y after the apprenticeship step.

Figure 2:
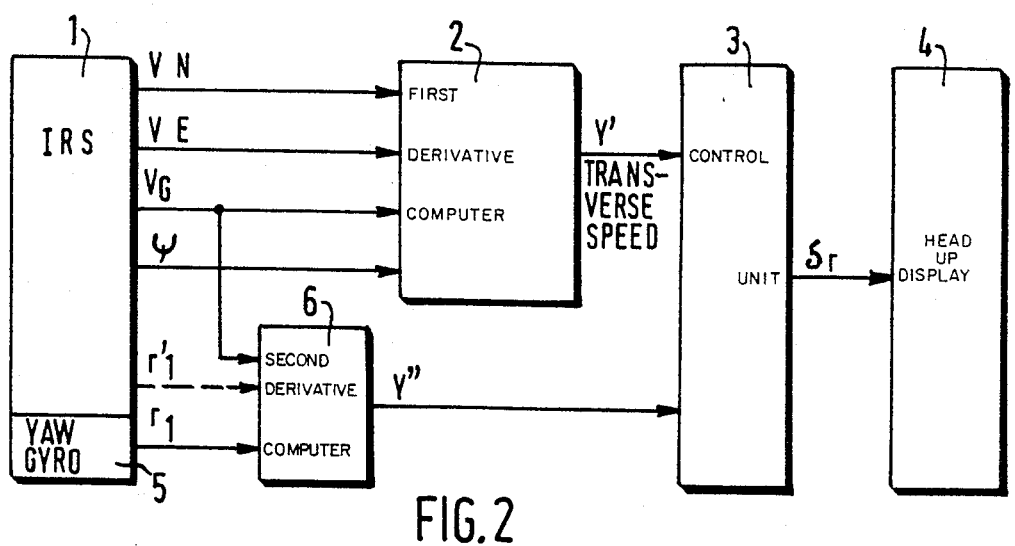
FIG. 2 is a diagram of the organization of an on board computer of an aerodyne with its connections to the sensors and to the display system.

These different calculations may be made by means of the system whose organization is shown schematically in FIG. 2 which includes an inertial unit 1 (IRS) delivering signals representative of the North speed (VN), of the East speed (VEst), of the ground speed VG and of the realigned azimuth $\psi o^*$ of the runway.

These signals are transmitted to a computer 2 which determines the first derivative Y' of the runway aberration Y, that is to say the metric aberration between the aerodyne and the axis of the runway, this first derivative Y' being obtained from the formula:

$$(Y' = \hat{V}T = \hat{V}E \cos(\psi o^*) - \hat{V}N \sin(\psi o^*))$$

This signal Y' is transmitted to the control block 3 of the head up display device 4 of the aerodyne. This block 3 is designed for providing, to the display device 4, a guidance order signal δr, for example in the form of $\delta r = K(Y + \tau_1 Y' + \tau_2 Y'')$, according to a given control law similar to that used in the guidance systems using radioalignment ("localiser").

This block 3 further receives a YAW speed signal r1 delivered by a yaw gyro 5 from which is determined, by means of the signal VG delivered by the unit 1, the second derivative Y'' of the runway aberration Y. This calculation is worked out in block 6. It should be noted in this connection that the use of the yaw gyro is not obligatory, the yaw speed signal being able to be elaborated by the inertial unit 1 (connection r'1 shown with broken lines).

Figure 3:
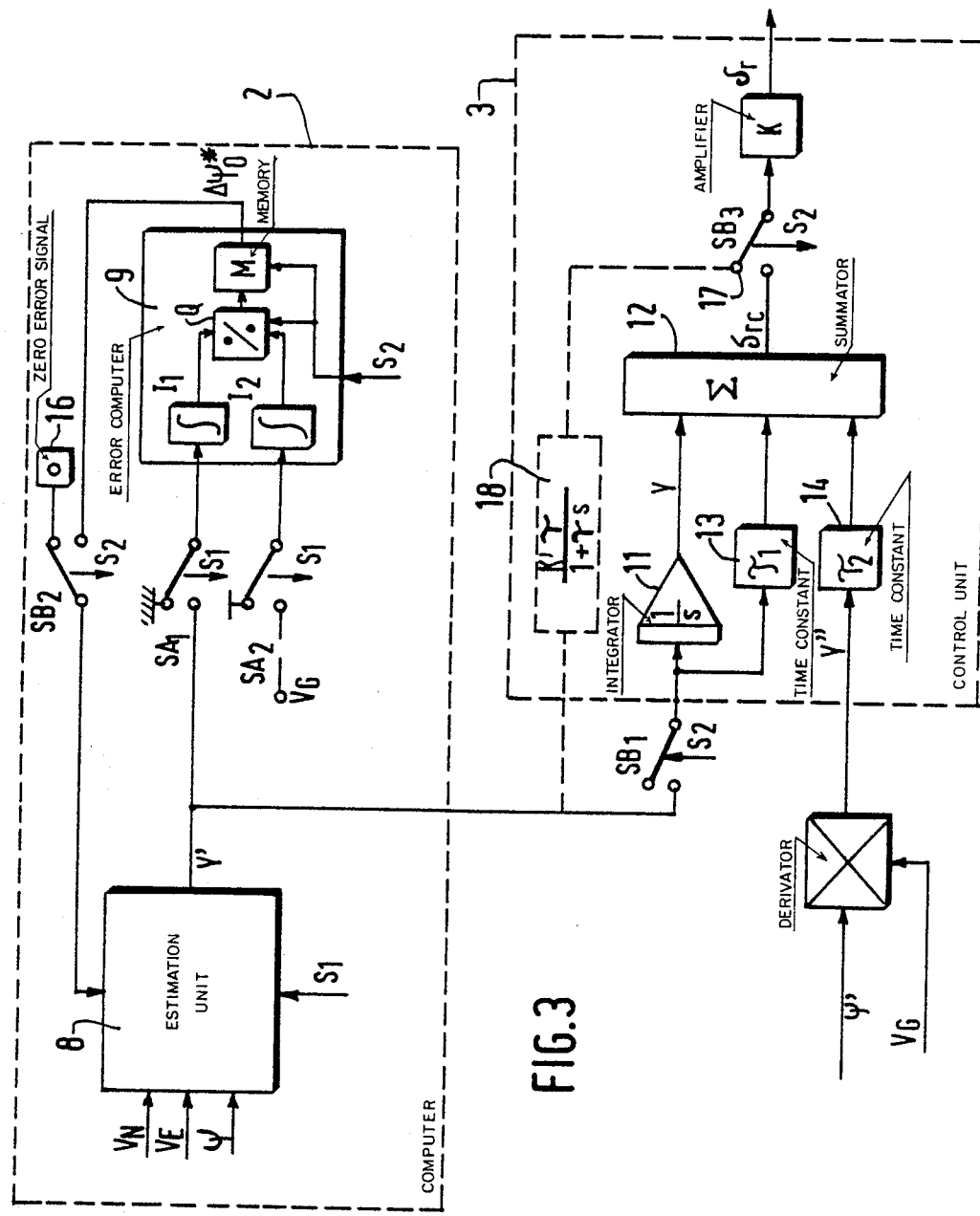
FIG. 3 is a block diagram of the circuit for determining the transverse speed Y' of the aerodyne with respect to the axis of the runway and of the circuit for controlling the display system.

FIG. 3 shows schematically one embodiment of the computer 2 and of the control block 3. In this Figure, computer 2 has been divided into two units 8, 9, namely: a unit 8 for estimating the transverse speed Y' of the aerodyne with respect to the axis of the runway and unit 9 for computing the error Δψo*.

The estimation unit 8 receives the signals VN, VE and ψ delivered by the inertial unit 1. It elaborates the signal Y' and transmits it to unit 9 through a switch $SA_1$ and to the control block 3 through a switch $SB_1$.

This estimation unit 8 is further connected to the output of unit 9 by means of a circuit including a switch $SB_2$. It further receives a control signal $S_1$ whose function will be explained further on.

The unit 9 for computing the aberration Δψo* further receives a signal representative of the ground speed VG through a switch $SA_2$ and a signal $S_2$ indicating the end of the apprenticeship step.

It comprises more especially, as shown, two integrators $I_1$ and $I_2$ whose inputs are connected respectively to the terminals $A_1$, $A_2$ of switches $SA_1$ and $SA_2$ and whose outputs are connected at the time of transmission of the signal $S_2$ to the two inputs of a divider shown by the block Q. These two integrators are initialized at o at the time of transmission of signal $S_1$, that is to say at time to.

The output of divider Q is connected to the input of a memory unit M whose access is controlled by the signal $S_2$. Thus, from time to, these two integrators effect the integration in time of the transverse speed vT* and of the ground speed VG.

At time tfin determined by the transmission of the signal $S_2$, these integrators then deliver the values Yo* and D and, consequently, at the output of divider Q the value Δψo* = Yo*/D is obtained. Concurrently, the memory unit M enabled for writing by the signal $S_2$ stores this value which, because of the switching of $SB_2$, is applied to the estimation unit 8.

At the input of the control block 3 the signal Y' is applied (if switch $SB_1$ is closed) to an integrator 11 (transfer function 1/s) which delivers a signal Y to a first input of the summator 12. This integrator 11 is initialized at o at the beginning of the second step (at the time when the signal $S_2$ is transmitted). This signal Y' is also transmitted to a network 13 with time constant τ1 connected by its output to a second input of the summator 12.

The third input of this summator receives through a network 14 with time constant τ2, a signal representative of the second derivative Y'' of the aberration signal Y, elaborated from the derivative of the signal ψ delivered by the unit 1 (or determined from a yaw gyro) and from the ground speed VG of the aerodyne.

At the output of the summator, a signal δrc is then obtained of the form:

$$\delta rc = Y + \tau 1 Y' + \tau 2 Y''$$

This signal is then transmitted to the display system through a switch $SB_3$ and a gain amplifier K.

The operation of the above described device is then as follows:

On coming onto the take off runway, the pilot disposes the aerodyne along the axis of the runway and stops. Concurrently, if that has not already been done, he starts up the guidance system, for example by pressing a button.

During this stop, computer 2 estimates the errors ΔVN and ΔVE with which the North and East speeds are affected as well possibly as the position at that moment on Schüler's sinusoid for determining, from the slope of this sinusoid at this position, what will be the variation of the errors ΔVE and ΔVN during take off (duration of the order of 30 seconds to two minutes).

Figure 4:
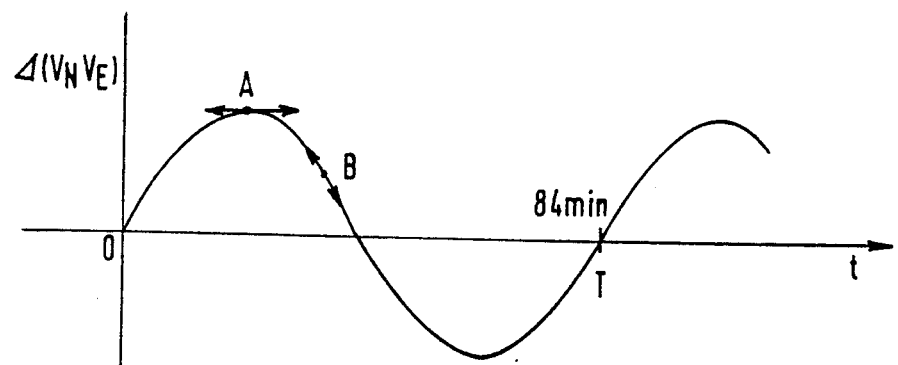
FIG. 4 is a diagram representative of Schüler's sinusoid.

In fact, if we refer to FIG. 4 which shows Schüler's sinusoid whose period is 84 minutes, it is clear that at position A the variation of the errors ΔVN and ΔVE will not be very great, whereas at position B, this variation will be much greater.

In practice, determination of the position on Schüler's sinusoid requires the knowledge of two positions on this curve. Now, the above mentioned stop at the end of the runway is not sufficiently long for determining two positions far enough removed for obtaining a significant result. This is why the invention proposes making the determination of the first point during a stop of the aerodyne preceding that made at the end of the runway. This stop may for example be the one normally made by the aerodyne in the passenger embarcation zone. It may also be carried out during the travel of the aircraft from the embarcation zone to the take off runway.

Once the errors ΔVE, ΔVN have been determined, the apprenticeship step is begun. It begins when the throttle lever of the aerodyne is placed at maximum and, when, consequently, under the thrust of the engines the aerodyne begins to taxi along the axis of the runway. Action on the throttle lever initiates a control signal $S_1$ which is taken into account by the computer 2 and closes the switches $SA_1$ and $SA_2$. This action defines then the time to which forms the lower limit of the integrations carried out for determining the aberration Yo* seen by the unit between the aerodyne and the non realigned axis of the runway and the distance D travelled on the ground.

The apprenticeship step takes place during a period between time to when the aerodyne is still at speed O and time tfin when it reaches a predetermined speed, for example 100 knots.

During the first part of this step, between the time to and the time t1 corresponding to a predetermined speed, for example of 50 knots, the estimation unit 8 determines the transverse speed Y' of the aerodyne with respect to the axis of the runway as indicated above, whereas the computing unit 9 elaborates a false North error signal $\Delta\psi o^*$. However, this signal is not reinjected into the elaboration unit 8 which will only receive a zero error signal (block 16) from switch $SB_2$. Furthermore, because switches $SB_1$ and $SB_3$ are open, the control block 3 is disconnected from the display device, which supplies no information useful for piloting. The pilot then guides the aerodyne solely by his view of the runway.

It should however be noted that, for informing the pilot that the device is operating, it is possible to provide an additional connection (shown with broken lines) connecting the output of the estimation unit 8 to the terminal 17 of switch $SB_3$, this connection including a filtering cell 18 with transfer function of the type $$\frac{K'\tau}{1+\tau s}.$$

This connection thus allows information relative to the transverse aberration Y to be displayed on the display device, this value being progressively deleted to disappear after a given time for example of the order of 2 to 5 seconds.

In the second part of the estimation step (from 50 to 100 knots), the operation of the display device remains similar to the preceding one. However, in this case, switching of switches $SB_1$, $SB_2$, $SB_3$ which marks the premature end of the apprenticeship step (tfin), may be carried out in the two following cases:

1. Following malfunctions such as:
 a reduction of the speed of one of the critical engines of the aerodyne due for example to a breakdown of this engine, causing a considerable yaw torque,
 a reduction of the longitudinal speed of the aerodyne, making take off impossible if not dangerous,
 prohibitive lateral acceleration for example following a tyre burst,
 a reduction of visibility causing the pilot to interrupt take off;

2. When the aerodyne reaches a predetermined speed, for example 100 knots.

In both cases, because of the closure of switch $SB_2$, the false North error $\Delta\psi o^*$, delivered by unit 9 at the end of the apprenticeship step, will be transmitted to the estimation unit 8 which will elaborate a transverse speed signal Y' corrected for this error in accordance with the procedure which will be described hereafter with reference to FIG. 5.

Because of the closure of switch $SB_1$, this signal Y' will be transmitted to the control block 3 which will transmit to the display system (switch $SB_3$ being closed) the control signal $\Delta r$.

In the example shown in FIG. 3, the second derivative of the metric aberration Y is elaborated from the ground speed VG and of the drift with respect to time $\psi'$ from the geographic azimuth $\psi$, in accordance with the relationship:

$$Y'' = VG \times \left[ \frac{s}{1+s} \psi \right]$$

However, in the case where the aerodyne has available yaw speed information r1 (yaw unit or gyro), this second derivative could also be obtained from the relationship:

$$Y'' = VG \times r1$$

Figure 5:
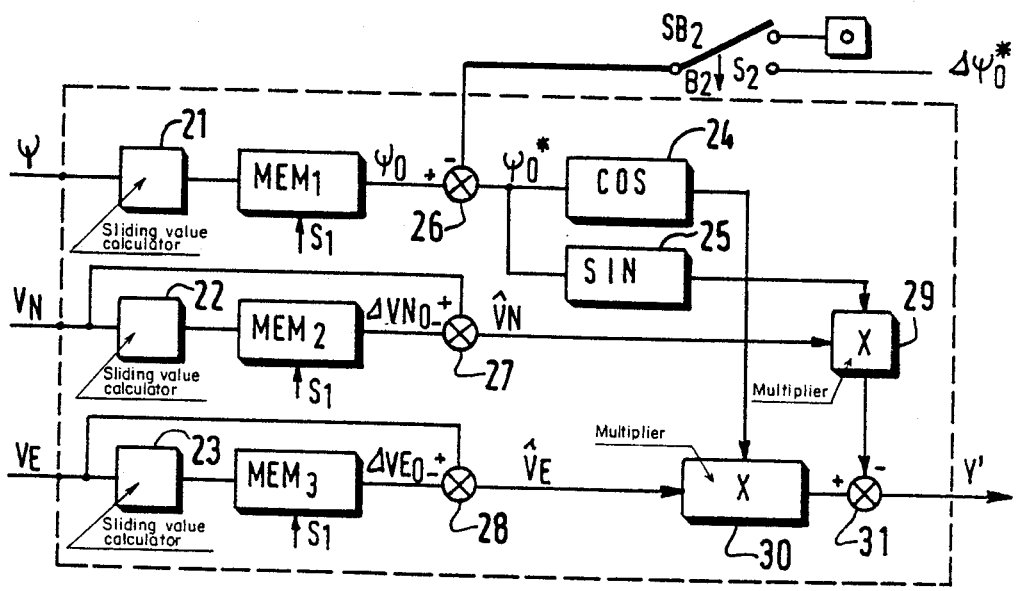
FIG. 5 is a theoretical block diagram of the estimation unit used in the circuit shown in FIG. 3.

Such as shown in FIG. 5, the estimation unit 8 includes three storage units $MEM_1$, $MEM_2$, $MEM_3$ whose inputs (writing) receive respectively the mean sliding values of the azimuth, of the North speed and of the East speed elaborated from the signals $\psi$, VN and VE delivered by the inertial unit. Calculation of these sliding values is made by circuits shown by blocks 21, 22 and 23 which deliver at any moment a mean value in a given period of time which has just elapsed. The storage units $MEM_1$, $MEM_2$, $MEM_3$ are controlled by the signal $S_1$ so that when this signal $S_1$ is transmitted they store respectively the mean values elaborated by blocks 21, 22, 23 and which in fact form the values $\psi o$, $\Delta VNo$ and $\Delta VEo$. The output of the storage unit $MEM_1$ is connected to the inputs of the sine function generator 25 and a cosine function generator 24 through a subtractor 26 whose (−) input is connected to the terminal $B_2$ of the switch $SB_2$ which delivers the signal $\Delta\psi o^*$ when the control signal $S_2$ is transmitted.

The subtractor 26 will consequently deliver either the mean signal $\psi$ during the apprenticeship phase and the signal $\psi o^* = \psi o - \Delta\psi o^*$ when the control signal $S_r$ is transmitted.

The storage unit $MEM_2$ is connected by its output to the negative input of a subtractor 27 which receives at its positive input the East speed signal VE delivered by the unit. The output of this subtractor 27 will therefore deliver the signal $\hat{V}N = VN - \Delta VNo$.

Similarly, the storage unit $MEM_3$ is connected by its output to the negative input of a subtractor 28 whose positive input receives the North speed signal VN delivered by the unit. The output of this subtractor 28 consequently delivers the signal $\hat{V}E = VE - \Delta VEo$.

The output of subtractor 27 is connected to an input of a multiplier 29 whose other input receives the signal transmitted by the sine function generator 25.

At the output of this multiplier 29 is obtained then a signal of type $\hat{V}N \sin \psi o^*$. Similarly, the output of subtractor 28 is connected to an input of the multiplier 30 which further receives the signal transmitted by the cosine function generator 24. This multiplier delivers then a signal of type $\hat{V}E \cos \psi o^*$.

The outputs of the two multipliers 29, 30 are connected respectively to the two inputs of a subtractor 31 which accordingly delivers, depending on the case, the signal:

$$\hat{V}T = \hat{V}E \cos \psi o - \hat{V}N \sin \psi o$$

during the apprenticeship stage or $$Y' = \hat{V}T = \hat{V}E \cos \psi o^* - \hat{V}N \sin \psi o^*$$

when the signal $S_2$ is transmitted.

Of course, the invention is not limited to the embodiment described above.

It could in fact include two or more inertial units, connected to the same computer. This latter could furthermore receive information concerning for example the speed of the engine or engines of the aerodyne, the position of the throttle lever, so as to transmit control signal $S_1$ of switches $SA_1$ $SA_2$ when the throttle lever is in its maximum position and for transmitting the control signal $S_2$ when:

the ground speed is greater than or equal to 100 knots, or the derivative of the rotational speed of a critical engine is less than a negative value, the derivative of the ground speed with respect to time is less than a predetermined threshold value, for example 2 knot/second, or the lateral acceleration of the aerodyne exceeds a predetermined threshold value.

What is claimed is:

1. A method for guiding an aerodyne on a runway having a longitudinal axis, particularly during the taxiing phase preceding take off, this method using, on board the aerodyne, at least one inertial unit and a computer, and further comprising at least the two following successive steps:
   (i) a first step, called apprenticeship step, during which the aerodyne begins the taxiing phase at low speed and is guided on site by the pilot along the said axis whereas, at the same time, the computer makes an estimation of at least one parameter defining the said axis by means of information supplied by the inertial unit and stores the said parameter at the end of the first step, and
   (ii) a second step including the determination by the computer of a synthetic runway aberration signal which is representative of the distance between the position of the aerodyne determined by the computer from said information and a theoretical axis of the runway calculated from the previously stored parameter, and guiding the aerodyne based on said synthetic runway aberration signal.

2. The method as claimed in claim 1, further including, for overcoming the alignment defect of the inertial unit in azimuth guidance:
   (a) during said apprenticeship step:
      (i) detecing by the unit of the North and East speeds VN and VE as well as the azimuth $\psi o$ of the aerodyne;
      (ii) estimating by the computer of the transverse speed vT of the aerodyne according to a relation of the type $(vT = VE \cos \psi o - VN \sin \psi o)$;
      (iii) calculating the distance Yo* between the said position and the said theoretical axis of the runway by integrating in time the transverse speed vT;
      (iv) calculating the distance D travelled overground by the aerodyne by integrating in time the ground speed VG of the aerodyne;
      (v) determining, by the computer, at the end of the apprenticeship step of a course error $\Delta \psi o^* = Yo^*/D$;
      (vi) storing this course error $\Delta \psi o^*$;
   (b) during the second step:
      (vii) estimating a corrected transverse speed vT of the aerodyne by calculating the transverse speed during said second step and by correcting this transverse speed with the course error $\Delta \psi o^*$ according to a relation of the type:

$(\hat{v}T = VE \cos (\psi o - \Delta \psi o^*) - VN \sin (\psi o - \Delta \psi o^*))$;

(viii) determining from this corrected transverse speed $\hat{v}T$ the said synthetic runway aberration signal for guiding the aerodyne.

3. The method as claimed in claim 2, which further comprises a first additional step including the following phases:
   (i) a first phase immediately preceding the apprenticeship step during which the aerodyne is stopped and aligned along the said axis of the runway, wherein the unit determines a value of North speed which represents a North speed error $\Delta VNo$ and a value of East speed which represents an East speed error $\Delta VEo$;
   (ii) a second phase wherein the computer stores the said values into a memory;
   (iii) a third phase wherein the said values are respectively substracted by the computer from North and East speeds VE and VN determinined by the unit during the apprenticeship step.

4. The method as claimed in claim 3, wherein the determination of the North and East speeds by the unit is affected by errors subjected to evolution in time according to a sinusoid named SHÜLER's sinusoid, having a slope substantially constant during a take off duration, said method comprising for taking into account the said evolution, a second additional setp for measuring in the said first additional step the errors affecting the North and East speeds, for estimating the slope of SCHÜLER's sinusoid in the take off and for correcting the North and East speeds as a function of said slope.

5. The method as claimed in claim 1, wherein the apprenticeship step includes two periods, namely:
   (1) a first period between a time to when the aerodyne is stopped and a time t1 corresponding to a first predetermined speed, in which the synthetic runway aberration signal is not used for the said guidance; and
   (2) a second period between t1 and a time tfin marking the end of the apprenticeship step, in which the apprenticeship step is stopped prematurely when at least one of the following conditions is occuring:
      (i) a reduction of the speed of one of the critical engines of the aerodyne causing an important yaw torque,
      (ii) a reduction of the longitudinal speed of the aerodyne, making take off impossible if not dangerous,
      (iii) prohibitive lateral acceleration causing a deviation of the aerodyne, from the longitudinal axis of the runway,
      (iv) a reduction of the visibility causing the pilot to interrupt take off.

6. A device for guiding an aerodyne on a runway having a longitudinal axis, particularly during the taxiing phase preceding take off, said device comprising on board the aerodyne:
   (a) at least one inertial unit delivering signals representative of at least the North speed (VN), the East speed (VE), the azimuth $\psi$ of the aerodyne, and a signal representative of its ground speed VG,
   (b) a computer having a memory and means for determining from signals delivered by the unit:
      (i) at least one parameter defining the axis of the runway, during a first so called apprenticeship step, during which the aerodyne guided on site by a pilot along the said axis begins the taxiing phase preceding take off, the said parameter being stored in the said memory at the end of this first step;
      (ii) a synthetic runway aberration signal which is representative of the distance between a theoretical axis of the runway calculated from the previously stored parameter and the position of the aerodyne determined from said signal delivered by said unit, and
(c) means for guiding the aerodyne during a second step based on the synthetic runway aberration signal.

7. The device as claimed in claim 6, wherein said computer further includes for implementing the said apprenticeship step:
   (i) means for estimating the transverse speed (vT) of the aerodyne;
   (ii) means for calculating the aberration (Yo*) between the aerodyne and the axis of the runway;
   (iii) means for calculating the distance (D) travelled over the ground by the aerodyne;
   (iv) means for determining, at the end of the apprenticeship step, of a course error $(\Delta\psi o^*) = Yo^*/D$);
   (v) means for storing the course error $\Delta\psi o^*$.

8. The device as claimed in claim 7, wherein said computer further includes for implementing said second step:
   (i) means for estimating the transverse speed ($\hat{v}t$) corrected for the course of error ($\Delta\psi o^*$), and
   (ii) means for determining from this corrected transverse speed said synthetic runway aberration signal.

9. The device as claimed in claim 6, wherein said computer includes means for determining errors affecting the North and East speeds determined by the unit during a first additional step preceding the apprenticeship step, during which the aerodyne, when stopped, is aligned along the axis of the runway and for deducting the said errors from values VE and VN of the East and the North speeds determined by the unit during the apprenticeship step.

10. The device as claimed in claim 9, wherein the determination of the North and East speeds by the unit is affected by errors subjected to evolutions in time according to a sinusoid named SCHÜLER's sinusoid, which presents a slope substantially constant during a take off duration and wherein said computer includes means for estimating, during said first additional step, the said slope, in the interval of time of the take off and means for correcting the North and East speeds determined by the unit as a function of said slope.

11. The device as claimed in claim 7, wherein said computer comprises an estimation unit for determining a signal representative of the transverse speed of the aerodyne from the azimuth, North speed and East speed signals supplied by the unit, means for correcting the transverse speed signal by said course error signal ($\Delta\psi o^*$), generated on an output of an error computer which receives the transverse speed signal through a first controlled switch (SA$_1$) and a signal representative of the ground speed of the aerodyne through a second controlled switch (SA$_2$), the said first and second switches passing to a closed state following application on said switches of a first control signal (S$_1$) marking the beginning of the apprenticeship step (time to), and a circuit connecting the output of the error computer to the means for correcting the transverse speed, said circuit comprising a third controlled switch (SB$_2$) passing to a closed state following application on said third switch of a second control signal (S$_2$) which marks the end of the apprenticeship step.

12. The device as claimed in claim 11, wherein said estimation unit comprises an output which delivers the said signal representative of the transverse speed, said output being connected to a control unit through a fourth switch (SB$_1$) controlled by said second control signal (S$_2$), said control unit delivering a driving signal to means for guiding the aerodyne.

13. The device as claimed in claim 12, wherein said control unit includes a summator with three inputs, namely:
   (i) a first input connected to the said fourth switch (SB$_1$) through an integrator of function 1/s,
   (ii) a second input connected to the said fourth switch (SB$_1$) through a net work with time constant ($\gamma_1$), and
   (iii) a third input which receives with a time constant ($\gamma_2$) a signal representative of the second derivative of an aerodyne/runway axis aberration signal (Y) determined from a yaw speed signal of the aerodyne and the ground speed (V G), said summator having an output connected to the said means for guiding the aerodyne through a fifth switch controlled by the said second control signal (S$_2$).

14. The device as claimed in claim 11, wherein said estimation unit comprises:
   (i) first, second and third storage units controlled by said first control signal (S$_1$), said first storage unit having a first output and an input connected to the inertial unit so as to store information representative of the azimuth ($\psi$) and to apply on the said first output an azimuth speed signal ($\psi$o) when said first control signal is emitted, said second storage unit having a second output and an input connected to the inertial unit so as to store information representative of the North speed (VN) and to apply on the said second output a North speed signal ($\Delta$VNo) when said first control signal is emitted, said third storage unit having a third output and an input connected to the inertial unit so as to store information representative of the East speed (VE) and to apply on said third output an East speed signal ($\Delta$VEo) when said first control signal is emitted;
   (ii) a first subtractor having a first positive input connected to the said first output of said first storage unit, a negative input connected to the output of the error computer through the said third controlled switch (SB$_2$), and an output which delivers the azimuth speed signal ($\psi$o) when only the first control signal (S$_1$) is emitted and a first difference signal ($\psi o^* = \psi o - \Delta\psi o^*$) when said first and second control signals (S$_1$) and (S$_2$) are emitted;
   (iii) a sine function generator and a cosine function generator each having an input connected to the output of the first subtractor, the sine function generator having an output which delivers a signal sin $\psi$o* when the first and the second control signals are emitted, the cosine function generator having an output which delivers a signal cos $\psi$o* when the first and the second control signals (S$_1$) and (S$_2$) are emitted;
   (iv) a second subtractor having a negative input connected to the said second output of said second storage unit, a positive input connected to the inertial unit so as to receive information representative of the North speed, and an output which delivers a second difference signal ($\hat{V}N = VN - \Delta VNo$) when the first control signal (S$_1$) is emitted;
   (v) a third subtractor having a negative input connected to the output of the third storage unit, a positive input connected to the inertial unit to receive information representative of the East Speed (VE), and an output which delivers a third difference signal ($\dot{V}E = VE - \Delta VEo$) when the first control signal ($S_1$) is emitted;

(vi) a first multiplier having two inputs connected respectively to the output of the sine function generator and to the output of the second subtractor, and an output which delivers a signal of the type (VN sin $\psi o^*$) when said first and second control signals ($S_1$, $S_2$) are emitted;

(vii) a second multiplier having two inputs connected respectively to the output of the cosine function generator and to the output of said third subtractor, and an output which delivers a signal of the type (VE cos $\psi o^*$) when the first and the second control signals ($S_1$, $S_2$) are emitted;

(viii) a fourth subtractor having a positive input connected to the output of the second multiplier, a negative input connected to the output of the first multiplier, and an output which delivers a signal (Y') representative of the transverse speed (VY) (VT) of the type $Y' = VT = VE \cos \psi o^* - VN \sin \psi o^*$, when the first and the second control signals ($S_1$, $S_2$) are emitted.

15. The device as claimed in claim 14, wherein the said error computer includes first and second integrators initialized at zero at the time of transmission of said first control signal ($S_1$), said first integrator having an input connected to said first switch and an output which delivers a signal (Yo*) representative of an erroneous runway aberration, said second integrator having an input connected to the second switch and an output which delivers a signal representative of the distance (D) travelled on the ground by the aerodyne during the apprenticeship step, and a divider whose two inputs are connected respectively at the time of transmission of said second control signal ($S_2$) to the outputs of the said first and second integrators, said divider having an output connected to a storage unit for storing the quotient (Yo*) which is representative of the course error ($\Delta \psi o^*$).

* * * * *